(12) United States Patent
Efimov (10) Patent No.: US 7,283,708 B2
(45) Date of Patent: Oct. 16, 2007

(54) DIGITALLY CONTROLLED OPTICAL FIBER DELAY LINE

(75) Inventor: Oleg M. Efimov, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 134 days.

(21) Appl. No.: 10/749,187

(22) Filed: Dec. 30, 2003

(65) Prior Publication Data
US 2005/0141814 A1 Jun. 30, 2005

(51) Int. Cl.
*G02B 6/26* (2006.01)
*G02B 6/00* (2006.01)
(52) U.S. Cl. .......................................... 385/39; 385/47
(58) Field of Classification Search ..................... None
See application file for complete search history.

(56) References Cited

U.S. PATENT DOCUMENTS

| | | | |
|---|---|---|---|
| 4,832,431 A * | 5/1989 | Nolting et al. ................. | 385/2 |
| 5,066,088 A | 11/1991 | Davies et al. | |
| 5,943,636 A * | 8/1999 | Baldwin et al. ............... | 702/85 |
| 6,147,799 A | 11/2000 | Macdonald | |
| 6,215,941 B1 | 4/2001 | Nagai et al. | |
| 6,690,855 B2 * | 2/2004 | Thompson et al. ........... | 385/27 |
| 6,763,154 B2 * | 7/2004 | MacDonald et al. .......... | 385/13 |
| 6,956,991 B2 * | 10/2005 | Madsen ......................... | 385/27 |
| 2002/0051602 A1 * | 5/2002 | Hung ............................ | 385/16 |
| 2002/0067877 A1 | 6/2002 | Braun et al. | |
| 2004/0234192 A1 * | 11/2004 | Madsen ......................... | 385/24 |

FOREIGN PATENT DOCUMENTS

EP 1099965 5/2001

OTHER PUBLICATIONS

Product information sheet, 2 pages, ODL 330, SANTEC Corp., Hackensack, NJ, USA.
Product information sheet, 1 page, Manually Variable Optical Delay, General Photonics Corp., Chino, CA, USA.
Product information sheet, 2 pages, µSLM, Boston Micromachines Corp., Watertown, MA, USA.
Product information sheet, 2 pages, http://www.littleoptics.com/delay.pdf, Little Optics, Inc., Annapolis Junction, MD, USA.

* cited by examiner

*Primary Examiner*—Sung Pak
(74) *Attorney, Agent, or Firm*—Ingrassia Fisher & Lorenz, P.C.

(57) ABSTRACT

An optical fiber delay line includes: multiple differential delay lines; and multiple switchers connecting the differential delay lines in pairs. Using, for example, N+1 differential delay lines numbered by k from 0 to N, the k-th differential delay line delays an input optical signal by an amount of time $(t^k_A - t^k_B) = 2^k \tau$, so that the electronically controlled switchers allow digitally controlling the delay over a range from 0 to $(2^{N+1}-1)\tau$ with a time resolution of $\tau$. The delay line can also be used simultaneously as a phase modulator, enabling a system of synchronization that can be realized entirely electronically and may be very useful in the case of large fiber arrays comprising a number of fiber modules such as beam splitters, fiber amplifiers, connectors, and collimators. The delay line can also be used as a commutator, for controlled switching of optical signals between channels.

17 Claims, 5 Drawing Sheets

DIGITALLY CONTROLLED OPTICAL FIBER DELAY LINE

BACKGROUND OF THE INVENTION

The present invention generally relates to optical communication systems and, more particularly, to the use of optical fibers in optical communication systems and a digitally controlled optical fiber delay line.

Optical delay lines are used ubiquitously in optical communications to arrange and control the optical data flows, synchronize optical pulses, and equalize the lengths of different channels in fiber arrays. Delay lines are employed in a time-multiplexing application, for example, in the buffers controlling the timing of signal routing, for synchronizing data bits, and for compensating dispersion and delay between different channels. In a number of cases, the application of adjustable time delays to communication channels is necessary, for example, to compensate for the influence of environmental conditions, the channel length change due to substitution of worn-out system parts, or just because of changing to an operating regime requiring different delays at different times. In addition, even a well-behaved network requires a new equalizing of the lengths of channels whenever any optical element is replaced or new splicing is produced.

Figure 1:
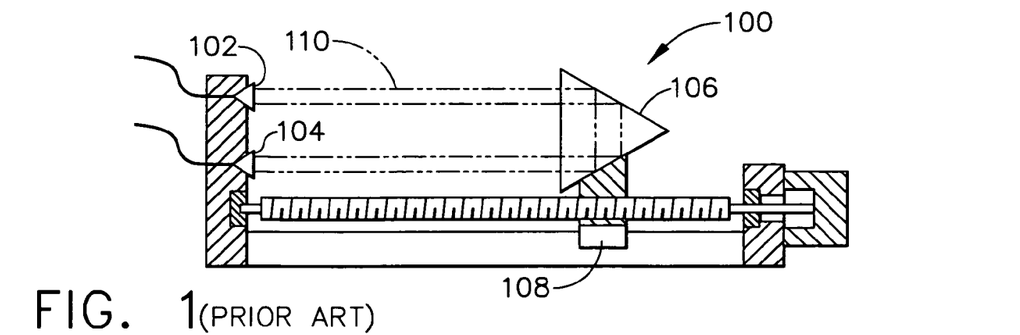
FIG. 1 is a schematic diagram of a prior art free space optical delay line.

The existing optical delay lines in present use can be divided into two large groups. One of the groups is based on light propagation through a free space with fixed or adjustable length. FIG. 1 illustrates an example delay line of this kind, which is disclosed in U.S. Pat. No. 5,066,088, issued Nov. 19, 1991, and incorporated by reference. Delay line 100 comprises a pair of fiber collimators 102, 104 and a reflection element 106, such as a mirror or prism, for example, placed on a motorized stage 108, which enables changing the optical path 110 from one fiber collimator, e.g. 102, to the other, e.g. 104, and so changing the delay. These devices have generally good accuracy and reliability. They typically have small dynamic range of time variation, however, which results from restricted size of the delay lines. For example, a 10 nanosecond (ns) delay corresponds to a 3 meter (m) optical path.

Figure 2:
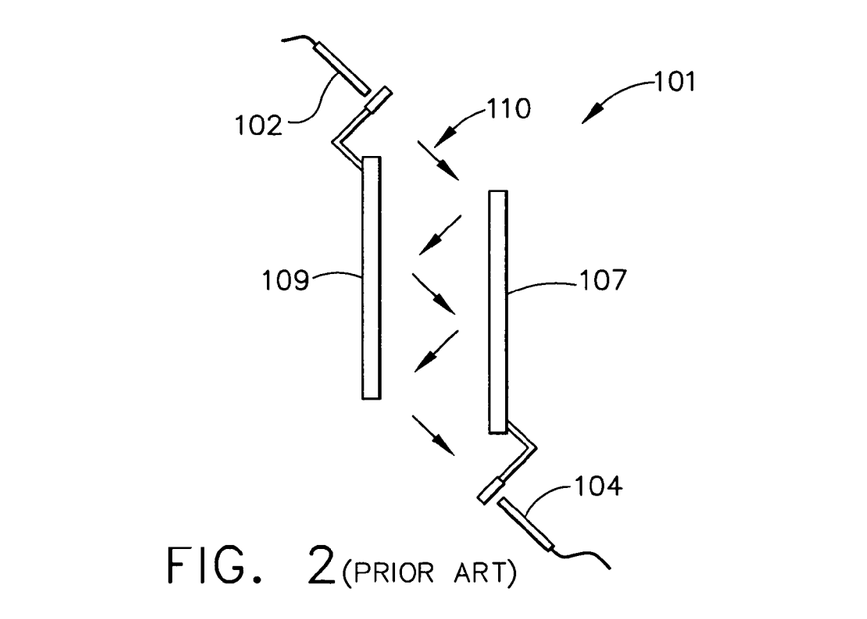
FIG. 2 is a schematic diagram of a prior art free space optical delay line using multiple reflections.

FIG. 2 illustrates another example delay line of this kind, which is disclosed in U.S. Pat. No. 6,147,799, issued Nov. 14, 2000, and incorporated by reference. Delay line 101 comprises a pair of fiber collimators 102, 104 and uses multiple reflections of optical path 110 from mirrors 107, 109 for dynamic range extension together with conserving the overall dimensions of the device. Nevertheless, an extension of the delay line dynamic range will lead to large overall dimensions and to an increase in the total losses. Both of these examples exhibit a low rate of switching between different delays resulting from the necessity of mechanical translation of the stage with either reflection element or collimator. To reach a higher accuracy of stage positioning, for example, a lower speed of translation is chosen, which leads to an increase in the switching time. Generally, it is not reasonable to expect a mechanical translation of such construction to give a switching frequency of more than a few Hertz (Hz). Delays lines of the kind represented by this first group are commercially available, for example, from SANTEC Corp. of Hackensack N.J., and General Photonics Corp. of Chino, Calif.

Figure 3:
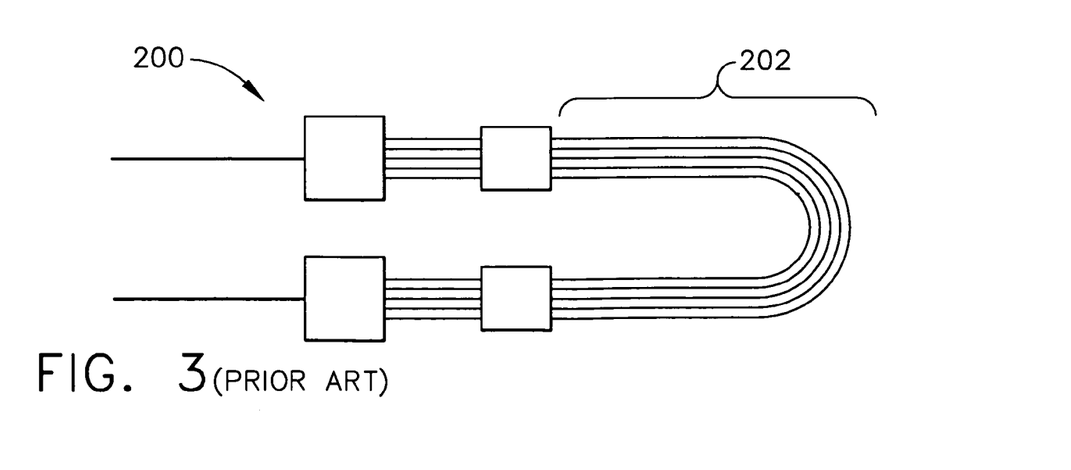
FIG. 3 is a schematic diagram of a prior art schematic optical fiber optical delay line.
Figure 4:
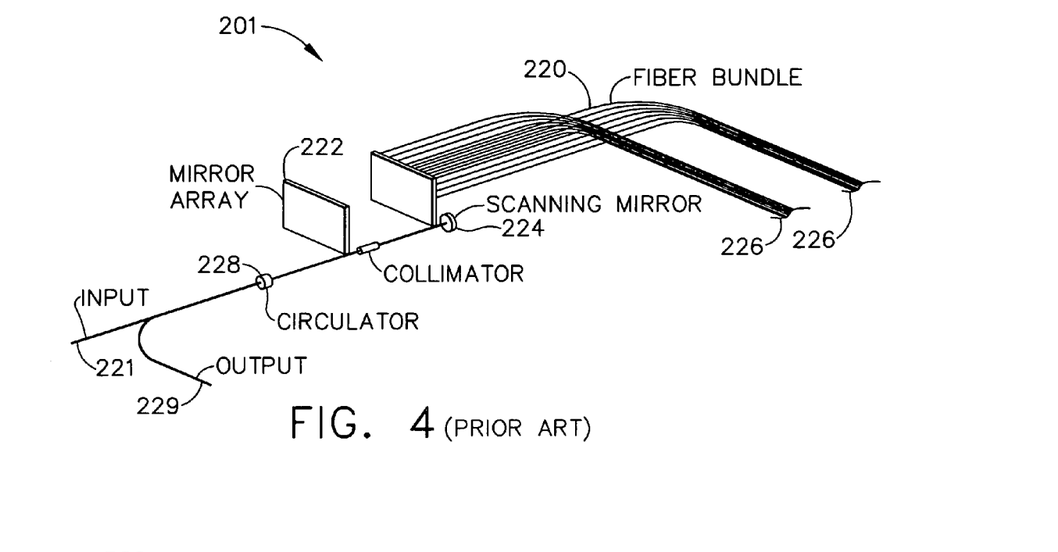
FIG. 4 a schematic diagram of a prior art optical fiber optical delay line.

The second group of existing optical delay lines is based on light propagation through fibers. If different delays are necessary for different pulses, a multi-fiber delay line incorporating nested optical fibers is usually used. An example of such a delay line is illustrated in FIG. 3 and is disclosed in European Patent No. EP1099965, published May 16, 2001, which is incorporated by reference. Delay line 200, shown in FIG. 3, includes a plurality of optical fibers 202, each having a "unique predetermined optical length." This kind of delay is often employed in time-multiplexing applications when the delay parameters are known and stationary. In this case, it is possible to modify the delays a little by stretching of the fibers through heating or piezoelectric expansion of the support which the optical fibers are attached to, however, it has a very restricted range of delay variation. Such a method of delay changing is disclosed in U.S. Pat. No. 6,215,941, issued Apr. 10, 2001, which is incorporated by reference. Because direct or dynamic modification of fiber length in a wide range—such as by stretching—is considered impossible, delay lines have been disclosed that use a number of fibers with slightly varying lengths for the realization of high resolution variable optical delay lines. An example of such a delay line is illustrated in FIG. 4 and is disclosed in U.S. Patent Application Publication No. US 2002/0067877, published Jun. 6, 2002, which is incorporated by reference. Delay line 201, shown in FIG. 4, includes a plurality of optical fibers designated as a fiber bundle 220. Switches between different fiber delays, i.e., between different length fibers of fiber bundle 220, are provided by using an optical micro-electromechanical mirror array 222 and a scanning mirror 224. After reflection from the end of the fiber arrays 226, the optical signal passes through the fiber delay a second time and the output 229 is separated from the input 221 with a circulator 228. This device has good response time, however, it is necessary to use a huge number of fibers to achieve delay variation over a wide range with high time resolution.

As can be seen, there is a need for an optical fiber delay line that combines a good time resolution over a wide dynamic range with the possibility of digitally controlling and fast switching the time delay. There is also a need for an optical fiber delay line that provides good time resolution over a wide dynamic range while using a minimal number and amount of optical fibers.

SUMMARY OF THE INVENTION

In one aspect of the present invention, an optical delay line includes: multiple differential delay lines; and multiple phase actuated switchers connecting the multiple differential delay lines.

In another aspect of the present invention, an optical delay line includes a plurality of optical fiber differential delay lines; and a plurality of phase actuated switchers connecting the plurality of optical fiber differential delay lines.

In still another aspect of the present invention, an optical communication system includes: a plurality of optical fiber differential delay lines; and a plurality of phase actuated switchers connecting the plurality of optical fiber differential delay lines in pairs. At least one of the plurality of optical fiber differential delay lines includes: a long A optical fiber, which is connected to a first one and a second one of the plurality of phase actuated switchers; and a short B optical fiber, which is connected to the same first one and the same second one of the plurality of phase actuated switchers.

In yet another aspect of the present invention, an optical system includes: a plurality of optical fiber differential delay lines; and a plurality of phase actuated switchers connecting the plurality of optical fiber differential delay lines in pairs. The plurality of optical fiber differential delay lines includes N+1 differential delay lines numbered by k from 0 to N, the plurality of phase actuated switchers includes N+2 phase actuated switchers numbered by k from 0 to N+1, and for each specific value of k, the k-th differential delay line includes: a k-th short B optical fiber having a length $L^k_B$ and connected between a k-th phase actuated switcher and a (k+1)-th phase actuated switcher of the plurality of phase actuated switchers; and a k-th long A optical fiber having a length $L^k_A$ and connected between the k-th phase actuated switcher and the (k+1)-th phase actuated switcher of the plurality of phase actuated switchers. The k-th differential delay line delays an input optical signal by an amount of time $(t^k_A - t^k_B)$ proportional to $(L^k_A - L^k_B)$. It is also the case that $(t^k_A - t^k_B) = 2^k \tau$, where $\tau$ is a time resolution of the optical delay line. Furthermore, the N+1 differential delay lines and the plurality of phase actuated switchers allow digitally controlling a differential delay $\Delta t$ over the range from 0 to $(2^{N+1} - 1)\tau$ with a time resolution of $\tau$; and $$\Delta t = \tau \sum_{i=1}^{M} 2^k,$$

where $\{k_1, \ldots, k_M\}$ is a set of the N+1 differential delay lines with an A optical fiber selected by one of the plurality of phase actuated switchers.

In a further aspect of the present invention, a phased fiber array system includes: a multi-channel programmable fiber delay line/phase modulator including, for at least one channel of a plurality of channels: a digitally controllable optical delay line comprising: a plurality of differential delay lines; and a plurality of phase actuated switchers connecting the plurality of differential delay lines in pairs. The plurality of phase actuated switchers allows digitally controlling a delay on the channel over the range from 0 to $(2^{N+1} - 1)\tau$ with a time resolution of $\tau$; and the plurality of phase actuated switchers simultaneously adjusts a phase of an input signal to modulate the phase of the input signal on the channel. The phased fiber array system further includes: an amplifier module connected to the multi-channel programmable fiber delay line/phase modulator; a photo detector that receives amplified signals from the amplifier module; and a feedback module that receives electronic signals from the photo detector and provides electronic control signals to the multi-channel programmable fiber delay line/phase modulator. The electronic control signals provide synchronization and phase adjustment of the input signal on the plurality of channels.

In a yet further aspect of the present invention, an optical phase modulator includes a plurality of optical fiber differential delay lines; and a plurality of phase actuated phase actuated switchers connecting the plurality of optical fiber differential delay lines. Each of the phase actuated switchers includes: a fiber coupler connected to at least one of the plurality of optical fiber differential delay lines; and a light phase adjustment device connected to the fiber coupler. Each of the light phase adjustment devices is simultaneously controllable to adjust a phase of an input signal and modulate the phase of the input signal.

In a yet further aspect of the present invention, an optical commutator includes: a plurality of optical fiber differential delay lines; and a plurality of phase actuated switchers connecting the plurality of optical fiber differential delay lines. At least one of the plurality of phase actuated switchers is connected to a channel; and at least one of the plurality of phase actuated switchers is connected to a fiber delay line.

In a still further aspect of the present invention, a method for providing a differential delay in an optical signal comprises a step of switching an input signal to have any delay in a pre-determined dynamic range with time resolution $\tau$.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides an optical fiber delay line that allows for digital control of the time delay over a wide dynamic range with good time resolution. Moreover, various embodiments can operate at high frequencies for fast switching the time delay, can provide a phase modulation of the transmitted beam, and can be easily reconnected between any of the fibers of an optical communication system module.

Embodiments of the present invention may be used in any type of optical communication system including, for example, metro, regional, and long-haul optical telecommunications systems, and systems employing multi-fiber arrays and switching networks. An embodiment may be used, for example, for arranging and controlling optical data flows, synchronizing optical pulses, and equalizing of the lengths of channels whenever any optical element is replaced or new splicing is produced. In one embodiment, an optical fiber delay line may be digitally controlled on the basis, unlike the prior art, of programmable choice of the required length of the fiber. Switching between different optical paths (and, thereby, between different lengths) may be realized by means of establishing the proper phase relations between the beams propagating through the fiber coupler/splitters. This method allows accurate adjustment of delays over a wide dynamic range of time variation using a relatively small number of channels. In addition, it is possible to use electronic control or feedback for adjustable modification of the delay in real time.

In one embodiment, the optical delay line consists of a series of differential delay lines and a spatial light modulator (SLM) or other elements allowing a high-speed modification of the beam phases. The differential delay lines may be connected in pairs by switchers with a multi-channel beam coupler/splitter on one side. The fibers from the other side of the beam coupler allow beam reflection with predetermined phase shifts between the beams. All of the beams can be switched in any predetermined channel by changing the phase relation between the reflected beams. Therefore, using such kind of phase actuated switcher we can choose a proper combination of delay lines that is a predetermined total delay. Because an SLM can operate with a frequency of about 10 to 100 kilo-Hertz (kHz), the switching time for the proposed method will be about 10 to 100 microseconds (μs), which is a quite short time for adjustable delay line switching. Of course, other phase modulators with a shorter switching time can also be used.

Typical prior art adjustable fiber delay lines usually consist of a number of fibers with slightly differing lengths designed to overlap a definite dynamic range of delays. Due to this arrangement, the number of fibers required increases dramatically with either or both range widening and decreasing the time increment (improving the time resolution) between successive delays. By contrast, in an embodiment of the present invention the required delay is formed by combining only properly selected lines. The selection of the proper lines can be compared to the representation of the desired length of fiber in binary or decimal notation as opposed to (by way of contrast to the prior art) supplying a multitude of fibers with a distinct, separate fiber having each possible length that may be desired and selecting the particular fiber of the desired length from the multitude. For example, to achieve fifteen distinct delays, the typical prior art method would require fifteen distinct lengths of fiber, say from 1 millimeter (mm) in length to 15 mm, using a total of 8 mm average length×15=120 mm of fiber. In contrast, one embodiment would require only four distinct lengths of fiber at 1, 2, 4, and 8 mm in length to achieve any of those fifteen distinct lengths, and using a total of only 1+2+4+8=15 mm of fiber.

As the number of distinct lengths of fiber required increases due to either or both of range widening and decreasing the time increment between successive delays, the difference increases dramatically, becoming more and more significant. For example, to overlap the dynamic range from 1 picosecond (ps) (approx. 200 micrometers (μm) of fiber) to 10 nanoseconds (ns) (approx. 2 meters (m) of fiber) with an increment, or time resolution, of 1 ps the total number of switchers (or differential delay lines) for one embodiment of the present invention should be equal to the nearest integer greater than or equal to $\log_2 (10 \text{ ns}/1 \text{ ps})$ or 14; hence, the total fiber length of $$\left(\sum_{k=1}^{14} 2^k\right) \cdot 200 \, \mu m \approx 2^{15} \cdot 200 \, \mu m \approx 6.5 \, m$$

will be roughly enough. (In fact, the real fiber consumption may be higher because of being used in the subsidiary circuits.) For the prior art, on the other hand, to make a delay for each specific time under the same conditions, we will need 10,000 fibers with a total length approximately of 2m×0.5×(10 ns/1 ps)=10,000 m or 10 km. Therefore, using an embodiment of the present invention, the total length of the fiber needed for an accurately adjustable delay line with a wide dynamic range can be relatively small.

In one embodiment, another advantage originates from the possibility of fast electrical switching of the optical delay together with its digitalization that can provide a very convenient way for using feedback or any predetermined control algorithm. Additionally, this delay can simultaneously modulate a phase of a transmitting optical signal. Therefore, an embodiment of the present invention may be useful for phased multi-fiber array applications, for example, where temporal synchronization of optical pulses from different channels needs to be achieved and, in particular, where very short pulses (<10 ps or 2 mm of fiber) are used, a very accurate time adjustment is needed.

Figure 5:
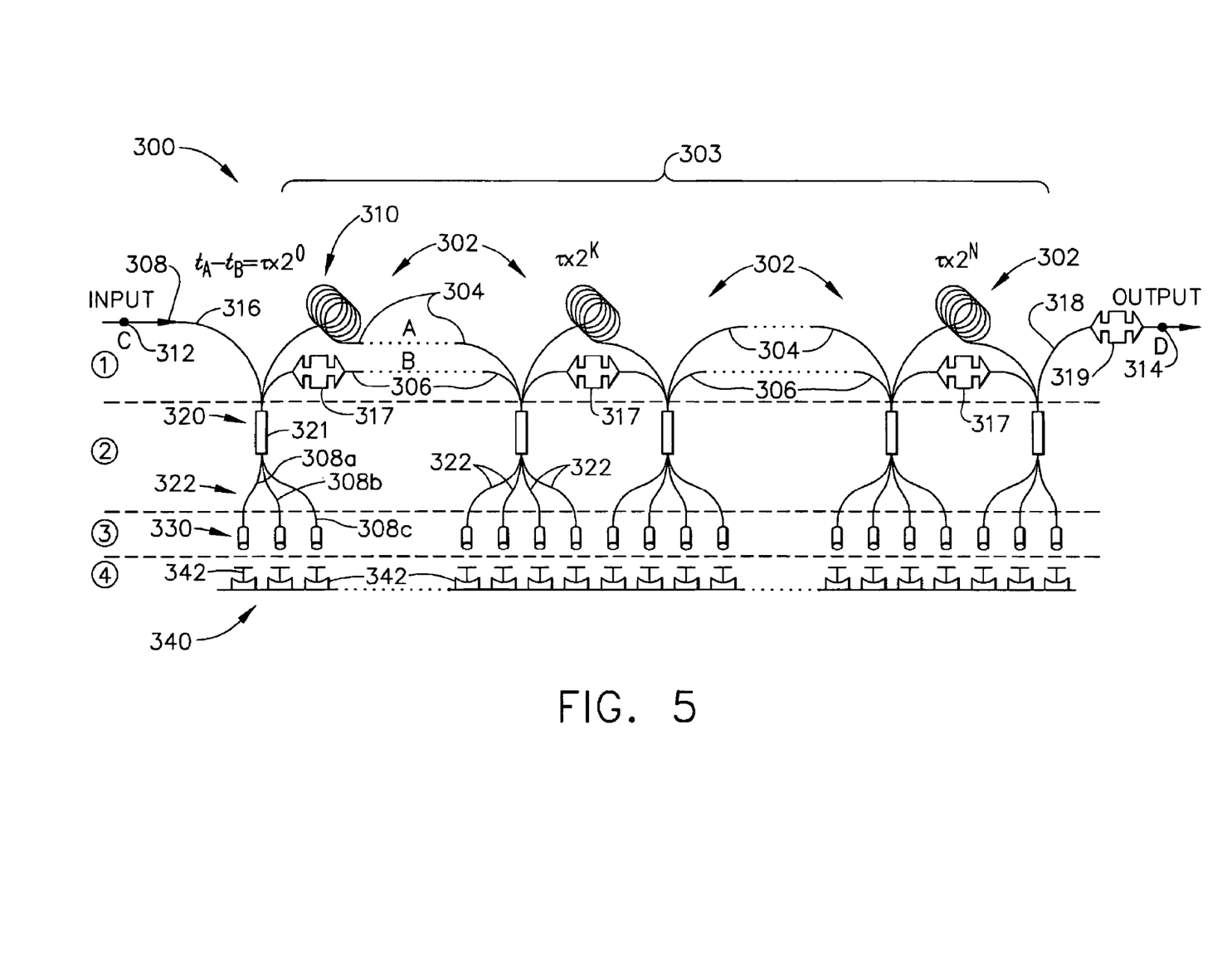
FIG. 5 is a schematic diagram of an optical fiber delay line according to one embodiment of the present invention.

Referring now to FIG. 5, a digitally controlled optical fiber delay line 300 is illustrated according to one embodiment. Optical fiber delay line 300 illustrates an exemplary device operating in binary notation. Optical fiber delay line 300 may comprise a number N+1 of differential delay lines 302, shown at level (1) of FIG. 5, a number N+2 of fiber couplers 320, shown at level (2) of FIG. 5, a number 4N+6 of fiber collimators 330, shown at level (3) of FIG. 5, and, shown at level (4) of FIG. 5, a spatial light modulator (SLM) 340 having a mirror 342 corresponding to each of collimators 330. Although SLMs are used to illustrate embodiments of the invention, other kinds of light phase adjustment devices, such as piezoelectric-stretchers, bi-refringent crystals, or other electro-optical modulators could also be used in place of collimators 330 and SLM 340. For example, in an alternative embodiment, mirrors could be affixed at the ends of switch fibers 322 instead of collimators 330, and piezoelectric stretchers could be disposed at or near the end of each of switch fibers 322 to effect the same electronically controllable phase adjustment provided in the illustrations by collimators 330 and SLM 340. In the following the combination of coupler 320, switch fibers 322, collimators 330, and electronically controllable phase modulation device—such as SLM 340 or equivalent electro-optical phase modulators—may be referred to as a "phase actuated switcher".

Differential delay lines 302, for example, may include optical fiber, as known in the art and generally commercially available. Fiber couplers 320 may include polished- or fused-tapered type fiber couplers, as known in the art, and may be implemented using 4×4 couplers commercially available, for example, from RiteKom Photonics Corp. of Foster City, Calif. Collimators 330 may be implemented, for example, using collimators which are commercially available from Acclivity Photonics, Inc. of Foster City, Calif., and which typically have a diameter≧125 μm. SLM 340 may be implemented, for example, using SLMs manufactured on the basis of micro-electromechanical systems (MEMS) technology by Boston Micromachines Corp. of Watertown, Mass., and which may be highly reflective SLMs, typically having a pixel size of 300 μm×300 μm and a total number of pixels of up to 1,024.

Each of the N+1 differential delay lines 302 may comprise a first, A, optical fiber 304 and a second, B, optical fiber 306. As indicated in FIG. 5, the differential delay lines 302 may be numbered from zero to N, with k being used generically to indicate any particular one of the N+1 differential delay lines. Thus, the k-th differential delay line 302 may comprise two optical fibers 304, 306, A and B, with the k-th A optical fiber 304 having a corresponding length $L^k_A$ and the k-th B optical fiber 306 having a corresponding length $L^k_B$. If the time resolution needed is $\tau$—for example, $\tau$ may be 1 ps as in the example described above—then the k-th differential delay line 302 for the exemplary embodiment of FIG. 5 should provide a differential delay between the k-th A and B optical fibers 304, 306 equal to:

$$t_A^k - t_B^k = (L_A^k - L_B^k)n/c = 2^k\tau \quad (1)$$

where n is the fiber refractive index and c is the velocity of light in free space. The number N (where N+1=number of differential delay lines 302) may be derived from the total maximal delay T required using the formula: N=floor[$\log_2$(T/$\tau$)], where "floor" means the nearest integer not exceeding $\log_2$(T/$\tau$).

An input signal 308 may pass through the first fiber coupler 321 and may be divided into three signals or beams 308a, 308b, 308c. Each of the beams 308a, 308b, 308c may go through a fiber collimator 330, may be reflected from the corresponding mirror 342 of SLM 340 back to the same corresponding collimator 330 and may be coupled by that collimator 330 back into the same fiber from which it came. A change in the corresponding SLM mirror positions will change the phase relation between the reflected beams. It is known in the art that the total power of all the beams can be directed to any output channel of a coupler—such as coupler 321—by a suitable combination of the input beam phases. Therefore, the input signal 308 can be switched either to the long branch, A optical fiber 304, or to the short branch, B optical fiber 306, of the first differential delay line 310 of the N+1 differential delay lines 302 by adjusting the positions of the mirrors 342 of SLM 340 corresponding to beams 308a, 308b, 308c. SLM 340 may be an electro-mechanical module that may be controlled, for example, using digital electronics such as a computer processor.

A similar switching may be carried out for each coupler 320, so that the A or B optical fiber may be selected for each of the N+1 differential delay lines 302. If the A optical fiber 304 is selected at the k-th differential delay line 302, put k in the set $\{k_1, \ldots, k_M\}$ so that, for example, $\{0, 1, 4\}$ means that the long A optical fiber 304 is selected at the first, second, and fifth differential delay lines 302 and the short B optical fiber 306 is selected everywhere else. Thus, any required differential signal delay $\Delta t$ (that is a multiple of $\tau$ and less than the total maximal delay T) can be represented as:

$$\Delta t = \tau \sum_{j=1}^{M} 2^{k_j} \quad (2)$$

For the example $\{0, 1, 4\}$, M=3 and the sum evaluates to $\Delta t = 19\tau$.

Turning on the combination of the $\{k_1, \ldots, k_M\}$ delay lines, i.e., selecting the long A optical fiber 304, which inserts the differential delay, only for each k in $\{k_1, \ldots, k_M\}$, the total signal delay between C input point 312 and D output point 314 may be calculated as:

$$t_{CD} = t_{St} + \sum_M t_A^{k_j} + \sum_{N+1-M} t_B^{k_j} \quad (3)$$

where N+1−M indicates the sum is taken over all the N+1 values of k (recall that k ranges in value from 0 to N) not in the set $\{k_1, \ldots, k_M\}$ and $t_{St}$ is a stationary signal delay in the input section 316 and output section 318 of the delay line 300 and in the sections between the couplers 320 and the SLM 340 mirrors 342.

Substituting equation (1) into equation (3) gives the following equations:

$$t_{CD} = t_{St} + \sum_M \left(t_B^{k_j} + 2^{k_j}\tau\right) + \sum_{N+1-M} t_B^{k_j} = \tau \sum_M 2^{k_j} + \left(t_{St} + \sum_{N+1} t_B^{k_j}\right) \quad (4)$$

$$t_{CD} = \Delta t + t_{Off} \quad (5)$$

where $t_{Off}$ is a constant minimal delay or a time offset equal to the time delay when the signal passes through all the short B optical fibers 306 and $\Delta t$ is the required differential time delay (see equation (2)) representing a variable part of the delay line 300, which variable part 303, comprising differential delay lines 302, allows digitally controlling (by means of SLM 340, for example) a delay over the range from 0 to $(2^{N+1}-1)\tau$ with a time resolution of $\tau$.

Some possibilities for the practical realization of an optical communication system incorporating a digitally controlled optical fiber delay line, such as delay line 300, lead to the following considerations. To provide a differential time delay between two fibers A and B with an accuracy of $\tau$, the length difference between them must be adjusted with an accuracy of $c\tau/n$. For instance, a time resolution of 1 ps corresponds to an accuracy of 200 μm in the fiber length difference. Usually, an accuracy of only a few millimeters is reachable for any length difference between the two A and B fibers. Therefore some additional elements like stretchers 317 (such as piezoelectric actuators, described above) placed in the branch A or B may need to be used for more accurate adjustment of this difference. For the sake of simplicity, all the lengths $L^k_B$ may be taken as approximately equal to one another. In this case the reference channel may have a length of about $(N+1)L^k_B$. For a multichannel system, the total lengths $t_{Off}$ of all the channels should be equalized after adjustment of the time differences in all the differential delay lines—such as differential delay lines 302. Such a final adjustment may be made, for example, with an additional stretcher 319.

Figure 6:
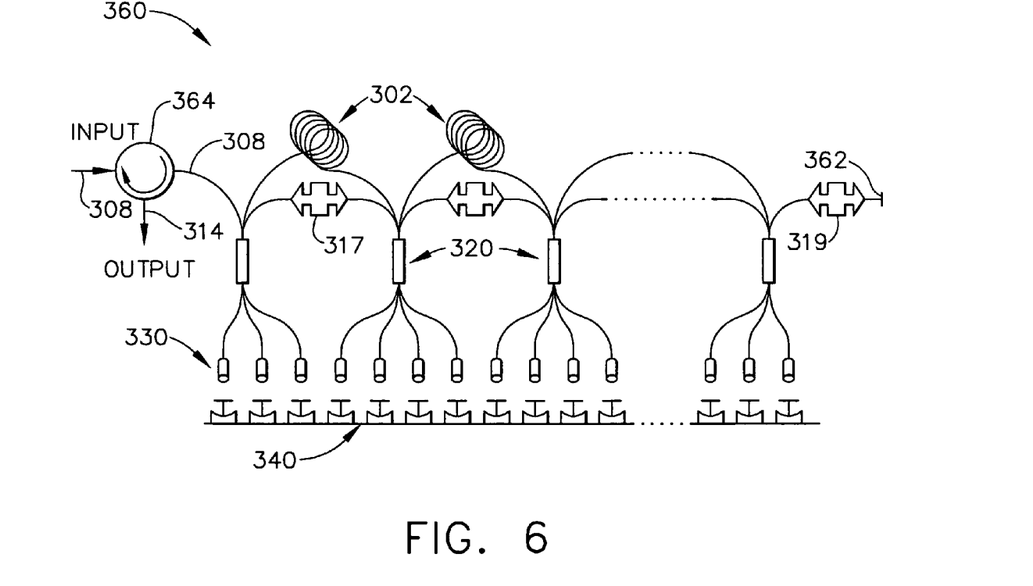
FIG. 6 is a schematic diagram of an optical fiber delay line according to another embodiment of the present invention.

Although the example embodiment described above uses a binary scale of notation, other scales of notation can, of course, be used, as well as other practical implementations for a digitally controlled delay line in accordance with an embodiment of the present invention. For example, FIG. 6 illustrates a digitally controlled delay line 360 according to an alternative embodiment. Delay line 360 may include, for example, differential delay lines 302, couplers 320, collimators 330 and an SLM 340 that are connected and function similarly to those used to illustrate delay line 300. An input signal 308 may pass through the delay line 360 a second time after total reflection from a mirror 362 and may be directed to the output 314 through a circulator 364, which may be similar, for example, to circulator 228 described above. Because the input signal 308 passes twice through delay line 360, the calculations described above should be doubled when applied to delay line 360. Delay line 360 may be more useful for certain applications where a single fiber for both input and output may be desired.

Figure 7:
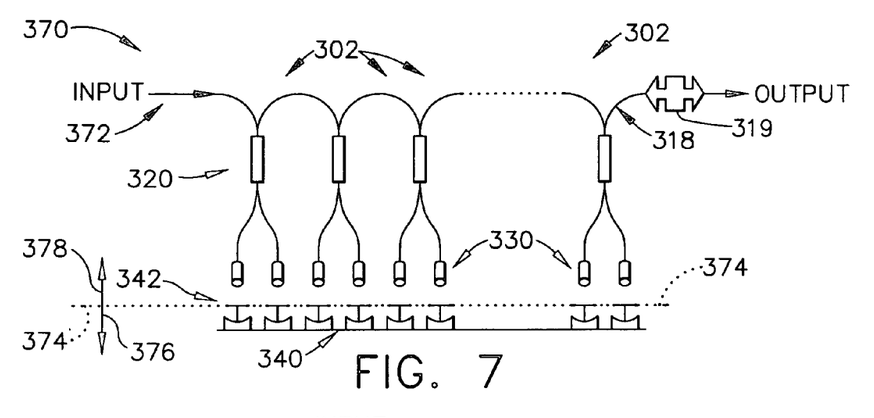
FIG. 7 is a schematic diagram for phase modulation of a transmitting beam according to one embodiment of the present invention.

A digitally controlled optical delay line according to an embodiment such as delay line 300 or 360 may be used simultaneously as a phase modulator, which may find application for phased fiber arrays, further described below. One possible way to operate a digitally controlled optical delay line 300, for example, as a phase modulator may be to create equal modulation of all the pixel positions of the SLM 340 included in the full delay line 300. It is known that a phase shift of λ/2 (where λ is the fiber laser wavelength, typically about 1.3 μm or 1.5 μm) is needed for a channel phasing. Because the total delay may include a large number N of differential delay lines, even small modulations of the pixel positions equal to ½×λ/2N can be enough to lock in the channels. We use the factor of ½ times the phase shift here because each beam double-passes the distance between the collimator 330 and the SLM mirror 342. For example, for λ=1.5 μm and N=10 (the dynamic range is $T \approx 2^{10}\tau$) a deviation of the pixels of over 40 nm will be enough for the locking technique. In this case, it is clear that such small modulations can be made at a relatively high frequency. Another way to achieve proper modulation, as illustrated by phase modulator 370 shown in FIG. 7, may be to use one or more separated lines—such as line 372—with the above-described technology of switching, as is shown in FIG. 7. Equal modulation of all the pixel positions of the SLM 340 is indicated in FIG. 7 by dotted line 374 indicating equal positions for all mirrors 342 and arrows 376, 378 indicating equal adjustment of all positions for mirrors 342. Other kinds of devices including, for example, piezoelectric-stretchers and electro-optical modulators can successfully be used for phase modulation instead of an SLM.

Figure 8A:
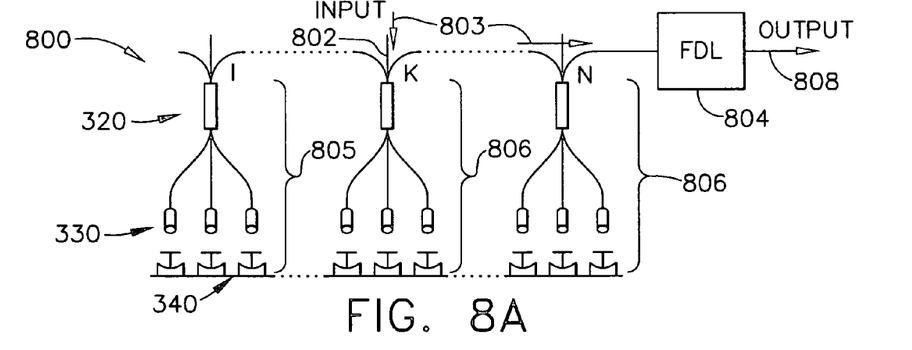
FIG. 8A is a schematic diagram for a commutator according to an embodiment of the present invention.
Figure 8B:
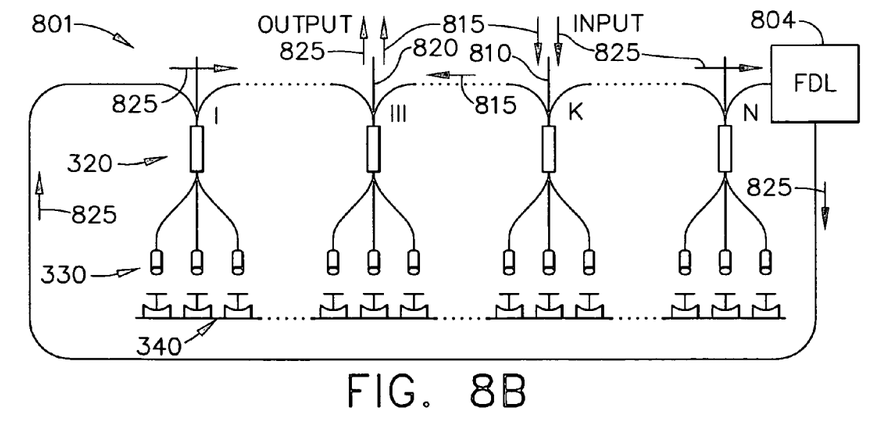
FIG. 8B is a schematic diagram for a commutator according to another embodiment of the present invention.

Referring now to FIGS. 8A and 8B, a delay line according to an embodiment such as commutator 800 shown in FIG. 8A or commutator 801 shown in FIG. 8B, can be easily connected to any needed channel or between any two fibers using the same SLM-based switching technology. This connectability may allow for convenient and flexible designs of different optical modules. FIG. 8A shows a commutator 800 for connecting any predetermined channel k 802 with a fiber delay line (FDL) 804 through the phase actuated switchers {k, k+1, ..., N} 806. (Each phase actuated switcher may include, for example, a coupler 320, corresponding collimators 330, corresponding mirrors 342 of SLM 340, and fibers 322 connecting the coupler 320 and corresponding collimators 330.) For example, SLM 340 phasing may be controlled as described above so that input signal 803 may be passed through phase actuated switchers 806 to FDL 804 while signals from phase actuated switchers 805 may be blocked. The output 808 of FDL 804 can be connected either with external devices or, as shown in FIG. 8B, with the phase actuated switcher #1 805 of the commutator 800.

FIG. 8B illustrates an alternative embodiment of a commutator 801. As illustrated in FIG. 8B, FDL 804 may be inserted between, i.e., connected in the path of, any two channels k 810 and m 820 of the commutator 801 (the path 825 of the connection from channel k 810 through FDL 804 to channel m 820 is indicated by arrows 825). Of course, because of the different number of the phase actuated switchers involved in the connection for different pairs of channels, the time offset $t_{off}$ (see equation (5)) can depend on the particular pair of channels {k, m} chosen. Therefore, an additional variable signal delay may be provided by the FDL 804 to make the total time offset independent of the number of phase actuated switchers involved. The same commutator 801 may also be used as just a commutator between any two channels, for example, channels k 810 and m 820, as is shown in FIG. 8B (the simple (not including FDL 804) path 815 of the connection from channel k 810 to channel m 820 is indicated by arrows 815).

Figure 9:
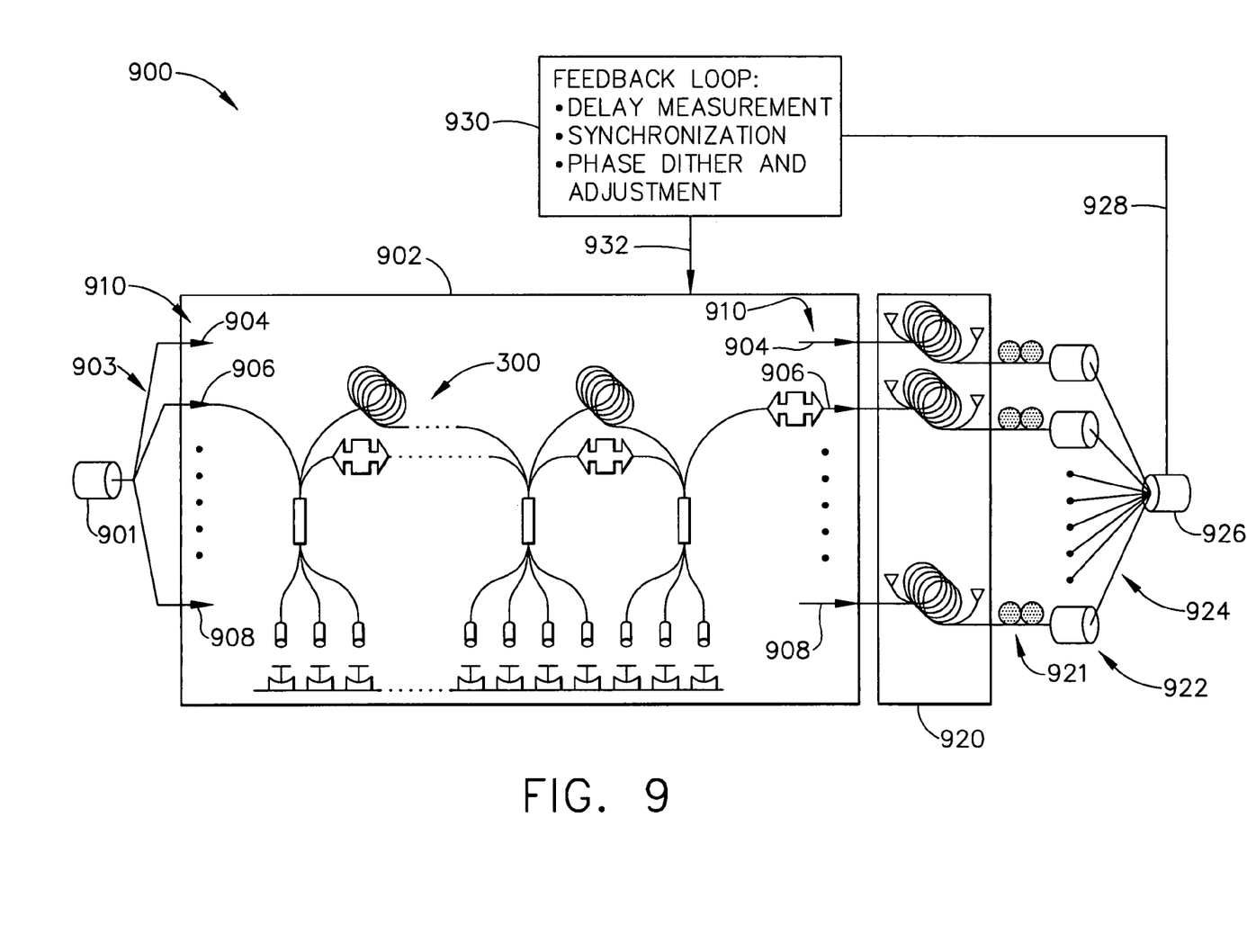
FIG. 9 is a schematic diagram for a phased fiber array system in accordance with one embodiment.

FIG. 9 illustrates a phased fiber array system 900 in accordance with one embodiment. Phased fiber array system 900 may include a multi-channel programmable FDL/phase modulator 902. FDL/phase modulator 902 may include multiple channels 910, such as channel 904, channel 906 and channel 908, for example. Each of the channels 910 may include a fiber delay line—such as fiber delay line 300—as shown for channel 906, which may be used simultaneously as a delay line and phase modulator as described above. For clarity, only channel 906 is shown in FIG. 9 with a fiber delay line 300 drawn in. Phased fiber array system 900 may also include an amplifier module 920 connected to FDL/phase modulator 902. Amplifier module 920 may include fiber amplifiers and pump lasers for each of the multiple channels 910. Amplifier module 920 may provide amplified signals 921 at its output to collimating lens array 922. Collimating lens array 922 may provide focused light beams 924 to photo detector 926. Photo detector 926 may provide electronic signals 928 to feedback module 930. For example, photo detector 926 may provide electronic signals 928 measuring the time delay between the pulses of the various channels 910. Feedback module 930 may provide electronic control signals 932 to FDL/phase modulator 902. Electronic control signals 932 may be used, for example, for synchronization and phase adjustment as further described below. FDL/phase modulator 902 may be fed at its optical input, for example, by a seed laser 901 that provides input light signals 903 to each of channels 910.

A digitally controllable delay line, such as digitally controlled delay line 300 may be especially useful for the implementation of a short pulse phased fiber array—such as phased fiber array system 900—because, first, such a digitally controlled delay line 300 may be capable of achieving a very high time resolution (small value of τ, such as 1 ps) and, second, if the reference channel, for example, channel 904, of the short pulse phased fiber array system 900 is a little longer than all the other channels 910 ($L_{ref} > NL^k_B$) and there is a possibility for monitoring the time delay between the pulses of the various channels—for example, using photo detector 926—a self-adjustable synchronization system with a digital control can be implemented using a delay line such as delay line 300. To do this, the time delay in each of channels 910—as measured, for example, by photo detector 926—may be electronically transferred into digital binary code with a step equal to the time resolution of the delay line used—for example, by feedback module 930. Then this code may be sent to the SLM—for example, via electronic control signals 932—to switch on a proper combination of delay lines—for example, by adjusting SLM mirrors 342—to individually adjust the delay of each channel using the multiple fiber delay lines 300. Such a system of synchronization can be realized entirely electronically and may be very useful in the case of large fiber arrays comprising a number of fiber modules such as beam splitters, fiber amplifiers, connectors, and collimators. Any replacement or modification of these modules can lead to a variation in the total length of the channel and, thus, to a change in the time delay and to the necessity of a system readjustment. Therefore, the implementation of a self-adjusting system—using an electronically digitally controlled optical delay line such as delay line 300—may be of great advantage and necessity for the practical realization of short pulse phased fiber arrays such as phased fiber array system 900.

Additionally, an adjustable controlled delay line—such as delay lines 300—may be useful in the case when the reference channel, for example, channel 904, of phased fiber array system 900 is broken. The locking technique assumes that the phases in all the channels 910 are modulated with respect to the reference channel 904. Therefore, in the typical setup, damage to the reference channel 904 will lead to the necessity of readjusting the phased fiber array system 900 as a whole. This can be a complicated task demanding either choosing a new reference channel or repairing the broken one, followed by synchronizing and phasing the whole system 900 again. By way of contrast, in the case of using delay line 300 as a phase modulation device, such as described above, which combines the features of a delay line and a phase modulator, this problem can be easily solved electronically with special software created in advance.

A method of creating a digitally controlled optical delay includes switching an input signal 308 into a long A optical fiber 304 or into a short B optical fiber 306 of a differential delay line 302. The method may further include switching the input signal 308 among a plurality of differential delay lines 302 so that a sum of delays, which may include any combination of long A optical fibers 304 and short B optical fibers 306, may be imposed on input signal 308. The method may further include providing a differential delay line 302 with a minimum time delay τ—referred to as time resolution τ—and providing other delay lines 302 with time delays of multiples of time delay τ and orders of magnitude multiples of time delay τ so that the input signal 308 may be switched among all possible combinations of long A optical fibers 304 and short B optical fibers 306 of the differential delay lines 302, and the differential delay of input signal 308 may sum to any multiple of τ within a predetermined total range. In other words, input signal 308 may be switched to have any delay in a pre-determined dynamic range with time resolution τ. For example, input signal 308 may be switched over a variable part 303 of a delay line 300, comprising differential delay lines 302, allowing digitally controlling a delay over the range from 0 to $(2^{N+1}-1)\tau$ with a time resolution of τ. The method may further include adjusting the phase of input signal 308 by simultaneously controlling multiple phase actuated switchers connected to differential time delay lines 302 to provide phase modulation of input signal 308.

It should be understood, of course, that the foregoing relates to preferred embodiments of the invention and that modifications may be made without departing from the spirit and scope of the invention as set forth in the following claims.

I claim:

1. An optical delay line comprising:
  a plurality of optical fiber differential delay lines, each comprising a long A optical fiber and a short B optical fiber; and
  a plurality of phase actuated switchers connecting said plurality of optical fiber differential delay lines, wherein:
  each of said plurality of phase actuated switchers is configured to switch an input signal to the long A optical fiber or the short B optical fiber of its respective optical fiber differential delay line; and wherein at least one of said phase actuated switchers includes:
  a fiber coupler connected to at least one of said plurality of optical fiber differential delay lines; and
  a spatial light modulator that reflects an input signal from said fiber coupler.

2. The optical delay line of claim 1 wherein for each of said plurality of optical fiber differential delay lines:
  said long A optical fiber is connected to a first one and a second one of said plurality of phase actuated switchers; and
  said short B optical fiber is connected to said first one and said second one of said plurality of phase actuated switchers.

3. An optical delay line comprising:
  a plurality of optical fiber differential delay lines, each comprising a long A optical fiber and a short B optical fiber; and
  a plurality of phase actuated switchers connecting said plurality of optical fiber differential delay lines, wherein:
  each of said plurality of phase actuated switchers is configured to switch an input signal to the long A optical fiber or the short B optical fiber of its respective optical fiber differential delay line; and wherein at least one of said phase actuated switchers includes:
  a fiber coupler connected to at least one of said plurality of optical fiber differential delay lines;
  at least one switch fiber connected to said fiber coupler; and
  a piezoelectric-stretcher attached to said switch fiber.

4. The optical delay line of claim 1 wherein at least one of said plurality of optical fiber differential delay lines comprises:
  a short B optical fiber having a length $L^k_B$;
  a long A optical fiber having a length $L^k_A$ wherein said differential delay line delays an input optical signal by an amount of time proportional to $(L^k_A - L^k_B)$.

5. The optical delay line of claim 1 wherein at least one of said plurality of optical fiber differential delay lines comprises:
  a short B optical fiber having a length $L^k_B$;
  a long A optical fiber having a length $L^k_A$ wherein:
  said differential delay line delays an input optical signal by an amount of time $(t_A - t_B)$ proportional to $(L^k_A - L^k_B)$; and
  $(t_A - t_B) = 2^k \tau$, for some integer value of $k \geq 0$, where τ is a time resolution of the optical delay line.

6. The optical delay line of claim 5 wherein:
  said plurality of phase actuated switchers connect said plurality of differential delay lines in pairs between an input and an output of the optical delay line so that a differential delay Δt between an input and an output of the optical delay line is the sum of the differential delays of each of the plurality of differential delay lines; and $$\Delta t = \tau \sum_{i=1}^{M} 2^{k_i},$$

where $\{k_1, \ldots, k_M\}$ is a set differential delay lines with an A optical fiber selected.

7. An optical communication system comprising:
  a plurality of optical fiber differential delay lines; and
  a plurality of phase actuated switchers connecting said plurality of optical fiber differential delay lines in pairs wherein at least one of said phase actuated switchers includes:
  a fiber coupler connected to at least one of said plurality of optical fiber differential delay lines;
  at least one switch fiber connected to said fiber coupler;
  a collimator at an end of said switch fiber; and
  a mirror of an electronically controlled spatial light modulator that reflects an input signal from said collimator back into said collimator; and wherein:

at least one of said plurality of optical fiber differential delay lines comprises:
a long A optical fiber wherein said long A optical fiber is connected to a first one and a second one of said plurality of phase actuated switchers; and
a short B optical fiber wherein said short B optical fiber is connected to said first one and said second one of said plurality of phase actuated switchers.

8. The system of claim 7 wherein at least one of said phase actuated switchers includes:
a fiber coupler connected to at least one of said plurality of optical fiber differential delay lines;
at least one switch fiber connected to said fiber coupler; and
an electronically controlled electro-optical modulator that adjusts the phase of an input signal in said switch fiber.

9. The system of claim 7 wherein at least one of said phase actuated switchers includes:
a fiber coupler connected to at least one of said plurality of optical fiber differential delay lines;
at least one switch fiber connected to said fiber coupler;
a collimator at an end of said switch fiber;
a stationary mirror; and
an electronically controlled bi-refringent crystal disposed between said collimator and said stationary mirror.

10. An optical communication system comprising:
a plurality of optical fiber differential delay lines; and
a plurality of phase actuated switchers connecting said plurality of optical fiber differential delay lines in pairs wherein at least one of said phase actuated switchers includes:
a fiber coupler connected to at least one of said plurality of optical fiber differential delay lines;
at least one switch fiber connected to said fiber coupler and terminated with a mirror; and
an electronically controlled piezoelectric-stretcher attached to said switch fiber between said fiber coupler and said mirror; and wherein:
at least one of said plurality of optical fiber differential delay lines comprises:
a long A optical fiber wherein said long A optical fiber is connected to a first one and a second one of said plurality of phase actuated switchers; and
a short B optical fiber wherein said short B optical fiber is connected to said first one and said second one of said plurality of phase actuated switchers.

11. The system of claim 7 wherein said plurality of optical fiber differential delay lines includes N+1 differential delay lines numbered by k from 0 to N, wherein N is a number greater than or equal to zero, and for each specific value of k, the k-th differential delay line comprises:
a k-th short B optical fiber having a length $L^k_B$;
a k-th long A optical fiber having a length $L^k_A$ wherein:
said k-th differential delay line delays an input optical signal by an amount of time $(t^k_A - t^k_B)$ proportional to $(L^k_A - L^k_B)$;
$(t^k_A - t^k_B) = 2^k \tau$, where $\tau$ is a time resolution of the optical delay line;
said N+1 differential delay lines and said plurality of phase actuated switchers allows digitally controlling a differential delay $\Delta t$ over the range from 0 to $(2^{N+1} - 1)\tau$ with a time resolution of $\tau$; and $$\Delta t = \tau \sum_{i=1}^{M} 2^k,$$

where $\{k_1, \ldots, k_M\}$ is a set differential delay lines with an A optical fiber selected.

12. An optical system comprising:
a plurality of optical fiber differential delay lines; and
a plurality of phase actuated switchers connecting said plurality of optical fiber differential delay lines in pairs wherein:
said plurality of phase actuated switchers comprises a plurality of mirrors of a spatial light modulator;
said spatial light modulator provides equal adjustment of positions for all mirrors simultaneously to phase modulate an input optical signal;
said plurality of optical fiber differential delay lines includes N+1 differential delay lines numbered by k from 0 to N, wherein N is a number greater than or equal to zero, said plurality of phase actuated switchers includes N+2 phase actuated switchers numbered by k from 0 to N+1, and for each specific value of k, the k-th differential delay line comprises:
a k-th short B optical fiber having a length $L^k_B$ and connected between a k-th phase actuated switcher and a (k+1)-th phase actuated switcher of said plurality of phase actuated switchers;
a k-th long A optical fiber having a length $L^k_A$ and connected between said k-th phase actuated switcher and said (k+1)-th phase actuated switcher of said plurality of phase actuated switchers and wherein:
said k-th differential delay line delays said input optical signal by an amount of time $(t^k_A - t^k_B)$ proportional to $(L^k_A - L^k_B)$;
$(t^k_A - t^k_B) = 2^k \tau$, where $\tau$ is a time resolution of the optical delay line;
said N+1 differential delay lines and said plurality of phase actuated switchers allows digitally controlling a differential delay $\Delta t$ over the range from 0 to $(2^{N+1} - 1)\tau$ with a time resolution of $\tau$;

$$\Delta t = \tau \sum_{i=1}^{M} 2^k,$$

where $\{k_1, \ldots, k_M\}$ is a set of said N+1 differential delay lines with an A optical fiber selected by one of said plurality of phase actuated switchers.

13. An optical phase modulator comprising:
a plurality of optical fiber differential delay lines; and
a plurality of phase actuated switchers connecting said plurality of optical fiber differential delay lines in pairs, wherein:
each of said phase actuated switchers includes:
a fiber coupler connected to at least one of said plurality of optical fiber differential delay lines; and
a light phase adjustment device that includes a mirror and is connected to said fiber coupler;
at least one of said plurality of optical fiber differential delay lines comprises a long A optical fiber connected to a first one and a second one of said plurality of phase actuated switchers, and a short B optical fiber connected to said first one and said second one of said plurality of phase actuated switchers; and each of said light phase adjustment devices is simultaneously controlled to equally adjust a phase of an input signal at all mirrors simultaneously so that said optical phase modulator modulates said phase of said input signal.

14. A method for providing a differential delay in an optical signal comprising the steps of:

switching an input signal, either into a long A optical fiber of a differential delay line or else into a short B optical fiber of said differential delay line, to have any delay in a pre-determined dynamic range with time resolution $\tau$; and phase modulating the input signal by simultaneously adjusting a phase of the input signal by an equal amount at a plurality of phase actuated switchers.

15. The method of claim 14 wherein said switching step further includes:

switching the input signal among a plurality of differential delay lines so that the input signal is delayed by a sum of delays and said sum of delays includes a combination of long A optical fibers and short B optical fibers of said plurality of differential delay lines.

16. The method of claim 14 wherein said switching step further includes:

providing a first differential delay line with a minimum time delay $\tau$;

providing at least one second differential delay line with a time delay that is a multiple of time delay $\tau$; and providing phase actuated switchers capable of switching the input signal among all possible combinations of long A optical fibers and short B optical fibers of said first and second differential delay lines so that a differential delay of the input signal may sum to any multiple of $\tau$ within a predetermined total range.

17. The method of claim 14 wherein said switching step further includes:

switching the input signal over a variable part of a delay line, wherein said variable part comprises a plurality of differential delay lines allowing digitally controlling a delay over the range from 0 to $(2^{N+1}-1)\tau$ with a time resolution of $\tau$, wherein N is a number greater than or equal to zero and N+1 is the number of said differential delay lines.

* * * * *